April 16, 1929.  A. H. NEUREUTHER  1,709,146
MACHINE FOR MANUFACTURING AND MOUNTING PINIONS AND WHEELS
Filed Dec. 17, 1923   11 Sheets-Sheet 1

INVENTOR.
Andrew H. Neureuther

April 16, 1929.  A. H. NEUREUTHER  1,709,146
MACHINE FOR MANUFACTURING AND MOUNTING PINIONS AND WHEELS
Filed Dec. 17, 1923    11 Sheets-Sheet 2

INVENTOR
Andrew H. Neureuther

April 16, 1929.   A. H. NEUREUTHER   1,709,146
MACHINE FOR MANUFACTURING AND MOUNTING PINIONS AND WHEELS
Filed Dec. 17, 1923    11 Sheets-Sheet 3

INVENTOR.
Andrew H. Neureuther

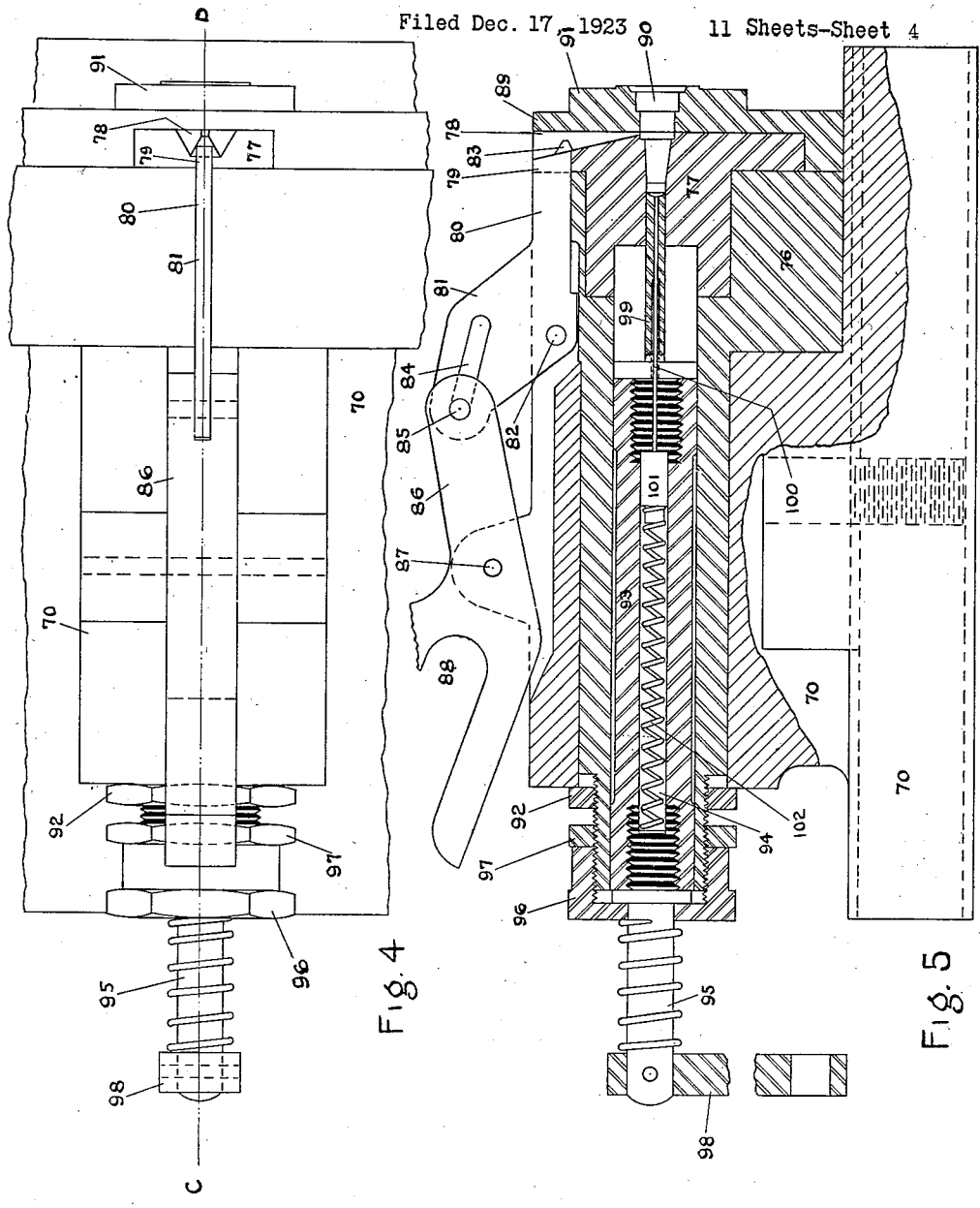

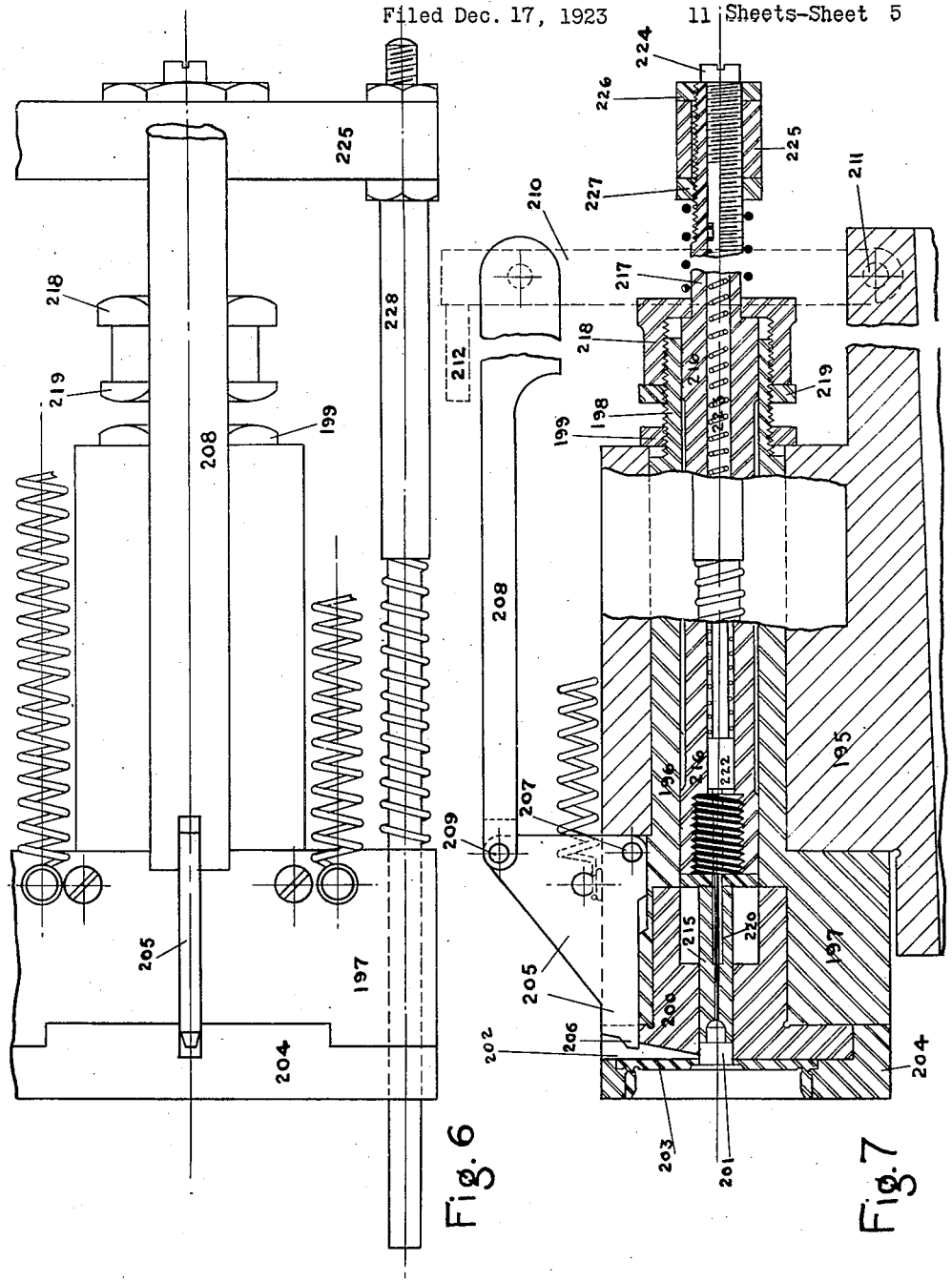

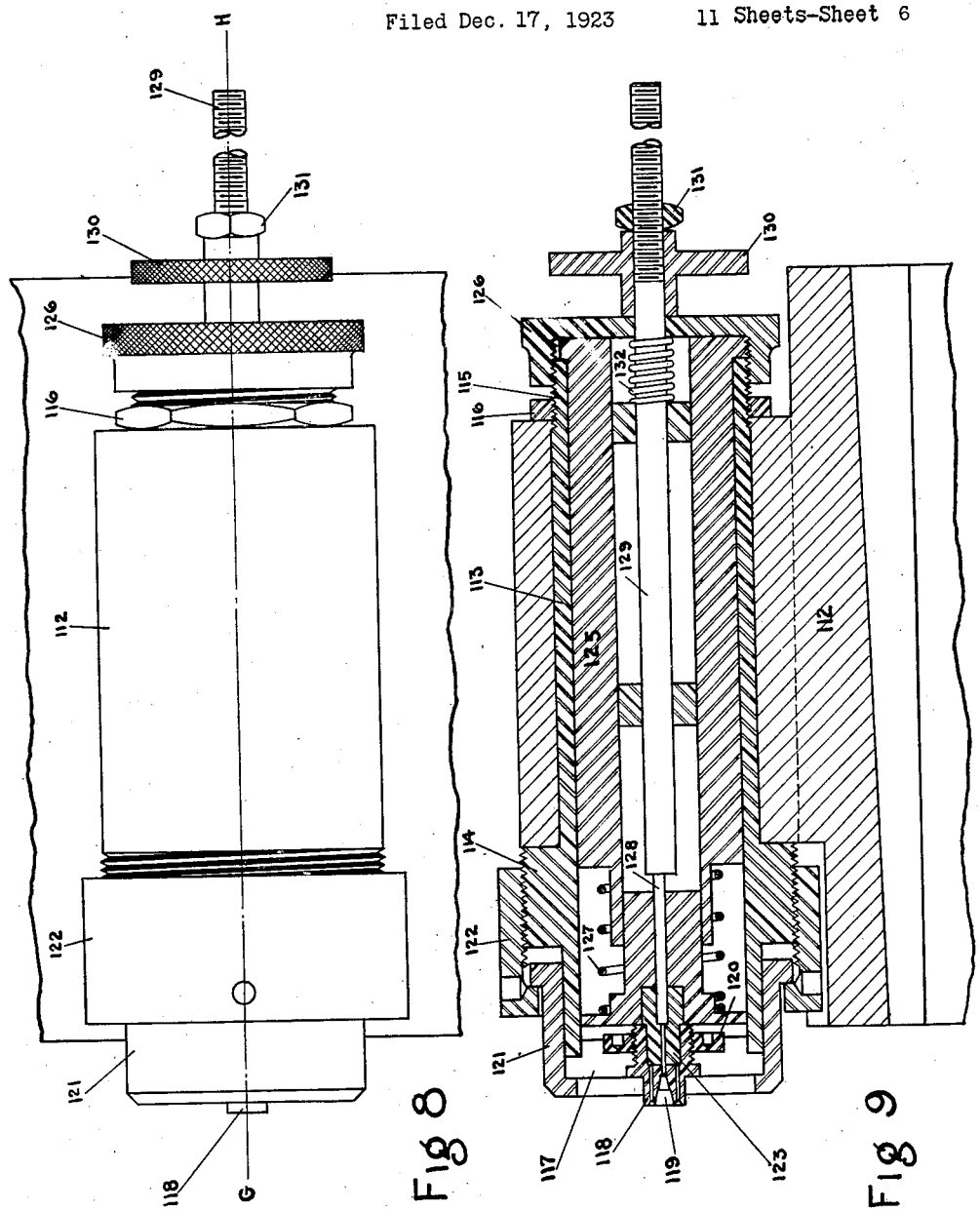

April 16, 1929.     A. H. NEUREUTHER     1,709,146
MACHINE FOR MANUFACTURING AND MOUNTING PINIONS AND WHEELS
Filed Dec. 17, 1923     11 Sheets-Sheet 7
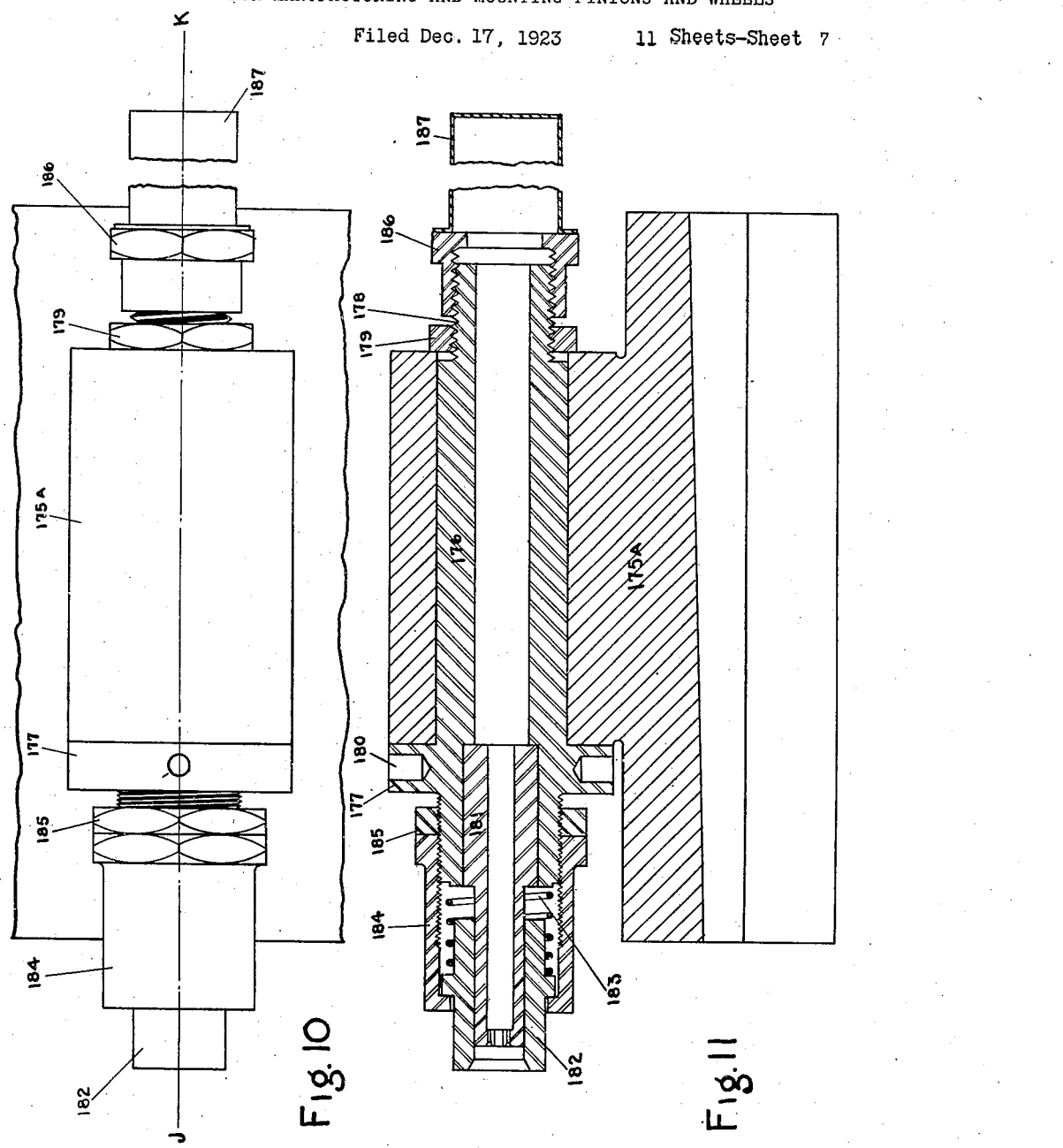

April 16, 1929.  A. H. NEUREUTHER  1,709,146
MACHINE FOR MANUFACTURING AND MOUNTING PINIONS AND WHEELS
Filed Dec. 17, 1923    11 Sheets-Sheet 8

INVENTOR
Andrew H. Neureuther

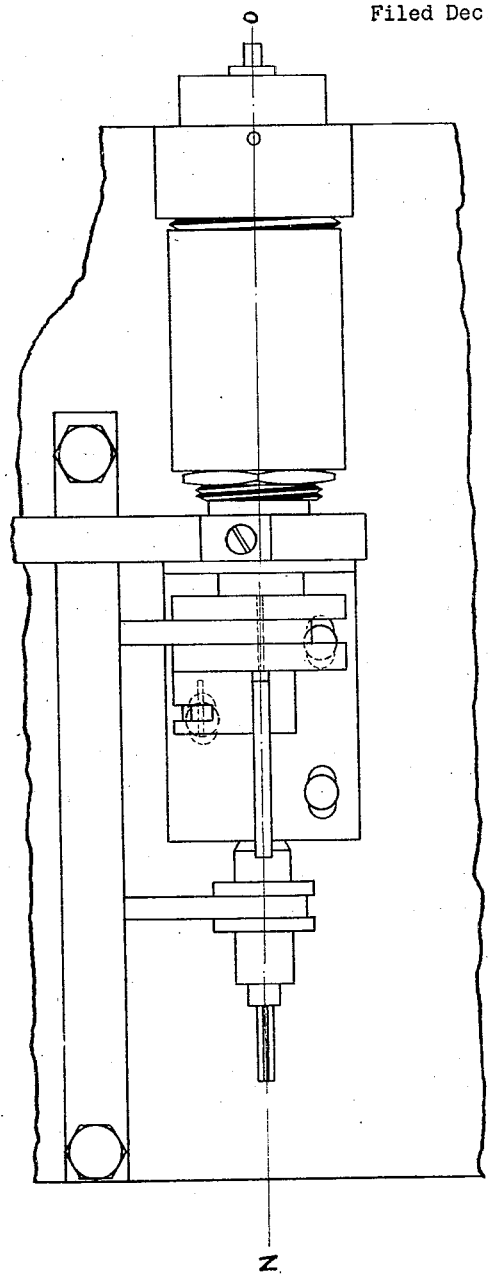
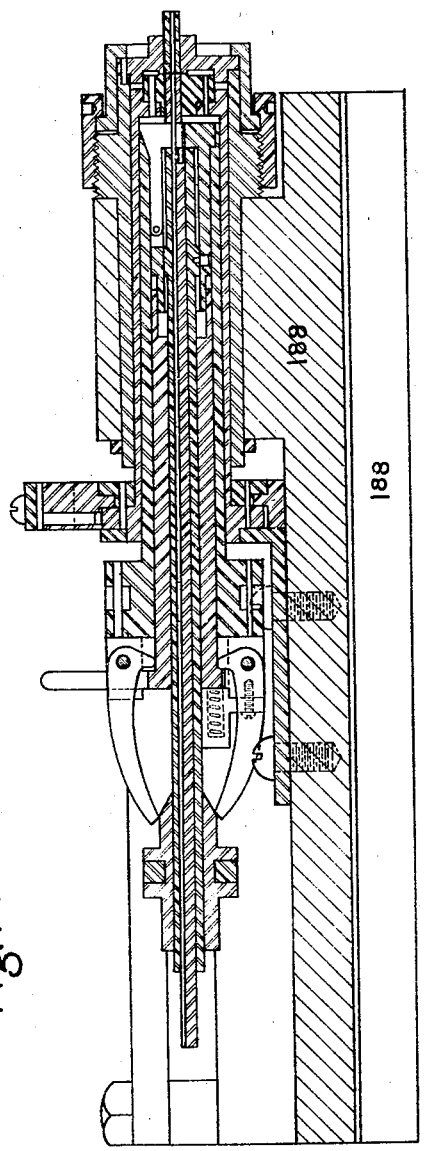

April 16, 1929.   A. H. NEUREUTHER   1,709,146
MACHINE FOR MANUFACTURING AND MOUNTING PINIONS AND WHEELS
Filed Dec. 17, 1923   11 Sheets-Sheet 11

Patented Apr. 16, 1929.

1,709,146

UNITED STATES PATENT OFFICE.

ANDREW H. NEUREUTHER, OF PERU, ILLINOIS, ASSIGNOR TO WESTERN CLOCK COMPANY, A CORPORATION OF ILLINOIS.

MACHINE FOR MANUFACTURING AND MOUNTING PINIONS AND WHEELS.

Application filed December 17, 1923. Serial No. 681,313.

My invention relates to improvements in machines for manufacturing and mounting pinions and wheels and has for its objects the production of such a machine in which the individual component parts are automatically placed and positioned into suitable holding means and said holding means are automatically and progressively brought into register with an assembling means and a uniting means whereby the pinion and pivot are assembled and the wheel is connected thereto and completed and means for removing said completed pinion and wheel from said assembling means.

Its further object is the production of a novel pinion assembling means and a novel wheel assembling means which with other novel devices will be more specifically set forth in the claims. An additional application, Serial No. 681,312, filed Dec. 17, 1923, has been filed claiming further novel means and devices.

I accomplish the above mentioned objects by the means shown in the accompanying drawings in which Fig. 1 is a front view of my invention.

Fig. 4 is a partial top view of the upper assembling means.

Fig. 5 is a cross sectional view of Fig. 4 along a line C. D.

Fig. 6 is a top view of the lower assembling device.

Fig. 7 is a cross sectional view of Fig. 6, along a line E. F.

Fig. 8 is a top view of the pinion and pivot holding means.

Fig. 9 is a cross sectional view of Fig. 8, along a line G. H.

Fig. 10 is a top view of the washer holding means.

Fig. 11 is a cross sectional view of Fig. 10, along a line J. K.

Fig. 14 is a top view of the pivot wire feeding device.

Fig. 15 is a cross sectional view of Fig. 14, along a line N. O.

Similar parts are indicated by the same numerals throughout the several views.

Figure 1:
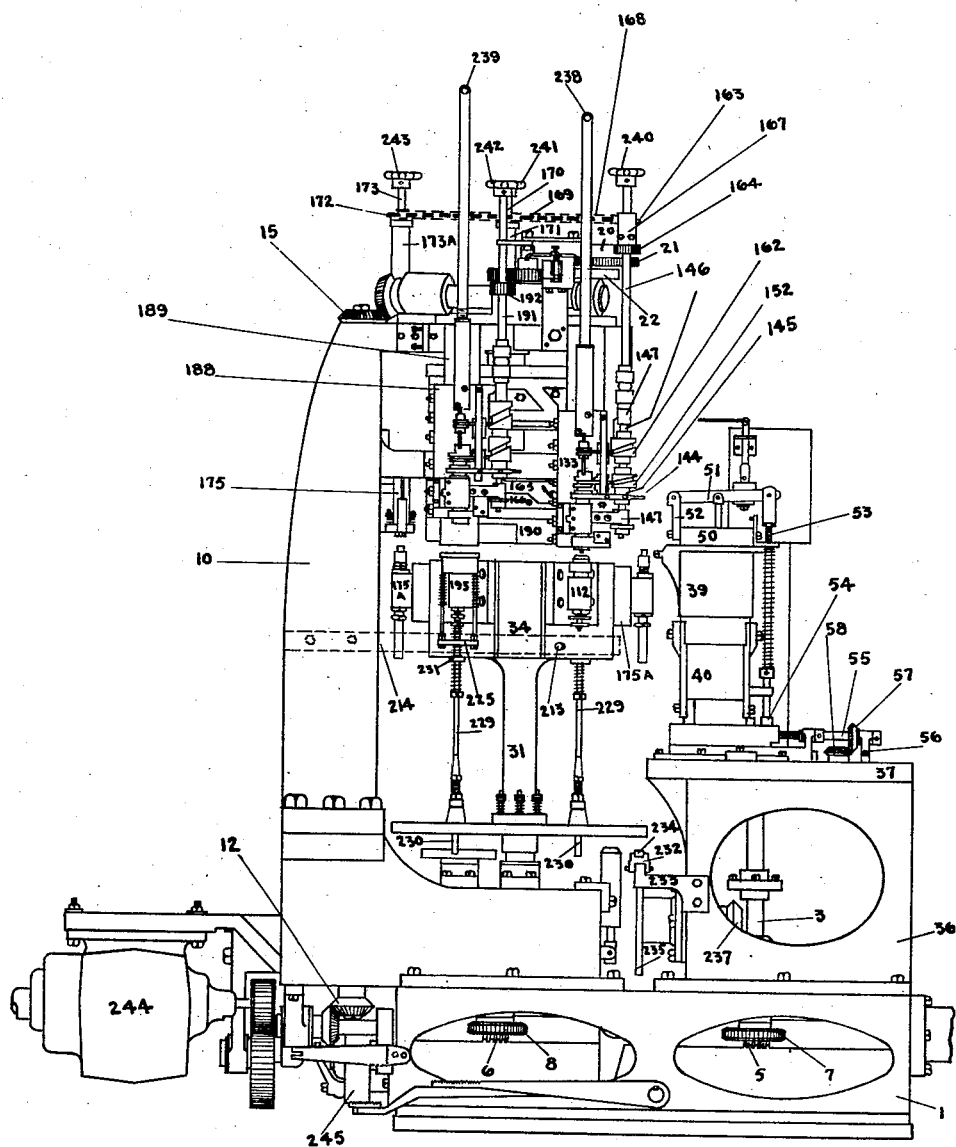

In the drawing 1 represents the base of my machine. Journaled on said base 1 are vertical shafts 3 and 4 which are driven by means of worms 5 and 6 on shaft 2 and worm wheel 7 on shaft 3 and worm wheel 8 on shaft 4. Mounted on base 1 is a bed plate 9 and mounted on the bed plate 9 is a vertical frame 10 shaped as shown. Journaled in frame 10 is a shaft 11 which is driven from shaft 2 by means of the bevel gears 12 and other intermediate gears not shown. Journaled on top of frame 9 in the bearing 13 shown is a shaft 14 which is driven from vertical shaft 11 by means of the bevel gears 15. Driven from shaft 14 by means of worm and wheel 16 is a vertical shaft 17 which is journaled in the upper horizontal parts of frame 10 as shown in Fig. 1. Also driven from shaft 14 by means of worm and wheel 18 is a vertical shaft 19 which is journaled in frame 20 as shown. Mounted on and fastened to shaft 19 is a segment gear 21 and a segment gear 22. Mounted on and fastened to shaft 17 is a cam wheel 23 and a cam wheel 24.

Vertical shaft 4 drives a shaft 25 which is journaled in a bearing 26, which is mounted on bed plate 9, by means of gears 27. Fastened on the upper end of shaft 25 is a plate 28 which carries a roll 29 as shown and which with plate 30 mounted on turret spider 31 forms a mechanical movement shown in my Patent No. 887,835 and gives an intermittent motion to turret spider 31, which is journaled on a pin 32 in casting 33 which is mounted on bed plate 9, as shown. The upper end of spider 31 is fastened to turret 34 by means of the cap bolts shown, which turret 34 is rotatively mounted on the shouldered lower portion of the over hanging part of frame 10 which part forms the positioning means as well as the journal bearings for the turret 34. By means of the mechanical movement above mentioned on the bottom of the spider 31, the turret 34 has six stopping points where the turret is completely at rest, and the turret is locked in said stationary position by means of the turret pin 35 and aperture in the turret shown which pin 35 is resiliently forced into the aperture in the turret by means of the usual spring which is not shown in the drawings.

Shaft 3 is extended upward and its upper end is journaled in a bearing 35 which is fastened to frame 36 whose top 37 forms a table on which is slidably mounted a member 38 which carries the casting pot 39 by means of supports 40. Mounted on the upper end of shaft 3 just above bearing 35 is a cam plate 41 with a cam groove 42 with cam roller 43 which is journaled on pin 44 which is fastened to slidable member 38 and actuates and controls the movement of casting pot 39 which has a molten metal chamber 46 which has the plunger 47, which operates in pumping chamber 48, which has an aperture 49, a nozzle duct 50, and a nozzle plate 45, which plunger is pivotally connected to lever 51, whose end is pivotally connected to the standard 52 fastened to the pot as shown, and whose other end is pivotally connected to a vertically slidable mounted rod 53 whose motion is controlled by means of a cam 54 slidably mounted on shaft 55 which is slidably and rotatably mounted in member 38 and journaled in bearing 56, and intermittently rotated 1 revolution at a time by means of bevel gears 57 on shaft 55 and bevel gear 58 mounted on shaft 59 journaled in 37 which shaft 59 has a gear 60 formed on its end which gear meshes with suitably placed segments of similar gear teeth formed on the periphery of cam 41. Gear 60 has a disk 61 with a suitable notch fastened to it as shown, and a suitable latch 62 pivotally mounted on 37 and resilient means not shown which are placed between said latch 62 and piece 63 on 37 which stops and positions the teeth on gear 60 so that they will properly engage the segment of gear teeth on 41 and permit gear 60 to make one complete rotation and it is evident that when gear 60 makes one rotation the molten metal pumping apparatus will make 1 stroke and give 1 discharge of molten metal through the nozzle plate 45 when same is slid forward and brought into contact with the assembling means to be described below. Nozzle plate 45 is kept clean by means of a wiper on a rod 64 which is fastened to shaft 65 journaled in member 38 on which shaft 65 is fastened a helical gear not shown which meshes with another helical gear (not shown) on a shaft 66 which shaft 66 is at right angles to shaft 65 and shaft 66 has a lever 67 fastened to it which lever is pivotally connected to a link 68 which is pivotally connected to a standard 69 which is mounted on 37 as shown.

It is evident that as member 38 is reciprocated by cam groove 42, its motion is transmitted to lever 67 and translated to rotary motion, turning shaft 66 and by means of the helical gears mentioned is transmitted to shaft 65 moving rod 64 forward and back across the front surface of nozzle plate 45 thus removing any dirt or excess molten metal from same and keeping it clean.

Mounted on turret 34 are three sets of two each component part holding devices or means comprising two pinion and pivot holding devices, two zinc washer holding and staking devices, and two similar holding devices being diametrically opposite in each instance. These holding devices spaced at six equisdistant points on turret 34 and so that with the intermittent motions of the said turret when the turret is stopped it brings each of these holding devices directly under and in line, or register with the upper holding or assembly means which comprises a member 70 slidably mounted in auxiliary frame 71 fastened to frame 10 as shown said member 70 being moved vertically and reciprocated by means of an auxiliary sliding member 72 to which it is connected by means of link 73, said sliding member 72 being actuated by suitably shaped cams 74 mounted on cam wheel 23, by means of cam roll 75 and pin shown fastened to said member 72. Said upper holding or assembling means is fitted into an aperture in said slidably mounted member 70 as shown (see Figs. 4 and 5) and comprises a tubular headed member 76 which has a somewhat larger cylindrical aperture on the larger end and into which is fitted the rear part of the mold 77 which has the aperture and cavity shown and which has the sprue duct 78, and channel 79 which registers with a channel 80 in 76. And into said channel is fitted the sprue ejector 81 which is pivotally connected to 76 by means of pin 82 and which has a projection 83 which projects into the sprue and enables the ejector to remove the sprue when the ejector 81 is partially rotated on pin 82 by means of the slot 84 in ejector 81 and pin 85 in lever 86 which is pivotally connected to 70 by means of pin 87 and the open slot 88 in lever 86. The mold portion of the assembling means is completed by the addition of a member 89 having an aperture 90 which is concentric with the aperture in piece 77 and member 89 has a cylindrical projecting member 91 which enters the wheel assembling holding means to be described below. Member 89 has formed in its portion opposite 91 a concentric cavity which registers and fits over the large part of 77 as shown and is fastened to member 76 by means of screws not shown. Member 76 is locked to 70 by means of the nut 92 shown. Slidably mounted on the inner tubular part of 76 is a member 93 which has an aperture 94 which has the enlarged screw threaded apertures at each end, one end of which has inserted in it a smaller projecting piece 95 which projects through a capping nut 96 which is locked in position by means of a lock nut 97 as shown. Projection 95, has fastened to it a part 98, and a spring placed on 95 between part 98 and capping nut 96 retains 93 in the position shown. In the other enlarged threaded aperture in 93 is a shouldered plunger 99 which is fastened to 93 by means of the screw threads shown. The smaller cylindrical part of 99 is slidably mounted in the rear of the aperture in 77, and is evident that a forward movement of 95 will cause plunger 99 to pass farther into the mold, and thus eject the assembled parts from the mold. The end of the plunger 9 is rounded out as shown. In the center of plunger 99 is an aperture which passes clear through said plunger. Filling out and slidably mounted in this aperture is a smaller plunger 100 which is fastened in a larger plug 101 which is slidably mounted in aperture 94 and retained in its forward position shown by means of spiral spring 102. Plunger 100 assists in clearing the mold, when the assembled parts are ejected by pushing the pivot clear from the aperture in plunger 99, and also cap the aperture to prevent same from filling in case a pivot is not in the assembling means when the molten metal is forced in the assembling means.

The lever 86 which operates the sprue ejector 81 is actuated as follows:—Slidably mounted on bearings 103 which bearings are fastened to frame 71 is a member 104 to which is fastened a projection 105 in the lower end of which is journaled a roller 106 as shown, which roller 106 when member 104 is reciprocated enters into the slot 88 and reciprocates lever 86, which ejects the sprue as above mentioned. Member 104 has a pin which enters and is actuated by a cam groove in the cam member 107, which is mounted on a shaft 108 which is journaled in a bearing fastened to frame 71, and which has a clutch slidably mounted on same, which engages with a similar clutch opposite it in line with it, and which is fastened to a shaft journaled in a bearing fastened to frame 10 as shown, and which has a gear 109 fastened at its left hand end, which engages with a ring gear 110, which is fastened to cam wheel 23. When it is desired to rotate cam 107, the clutch above mentioned is engaged by the usual pin and lever means not shown. Cam 107 has a projection 111, which when cam 107 rotates strikes the end 95 of assembling means 70 and ejects the united parts from the mold cavity 90 as above mentioned.

The pinion and pivot holding means is shown in Figs. 8 and 9, and comprises part 112 adjustably fastened to the turret 34. 112 has a large aperture as shown in which is mounted the head tube 113 which has a shouldered threaded part 114 and a smaller threaded part 115 by means of which it is fastened to 112 by the nut 116. In the upper end of 113 is the die holder 117 which secures the die 118, which has a plurality of equidistant apertures spaced equidistant from the center, or pivot or central aperture which has an enlarged cavity 119 as shown, and which die 118 is secured to die holder 117 by means of the threaded part and nut 120 shown.

Die holder 117 is held in place by means of a shouldered collar 121, which collar 121 is locked in position by means of nut 122. Die 118 has the end opposite cavity 119 enlarged so that a plug 123 having an aperture in line with pivot aperture shown enters said aperture in 118, and is held in position by means of a member 124 which is slidably mounted in the inner tubular part of 113, and slidably mounted in a member 125 which similarly fits into the inner tubular part of 113, and is locked in position by means of capping nut 126. Member 124 is held in position by means of the spring 127 shown. Passing through a central aperture shown in 124, and entering into the aperture of 123 is a positioning pin 128 mounted in a plunger 129 as shown, which plunger 129 is centrally spaced in part 125 and has a threaded end which passes through capping nut 126 and has mounted on it the knurled nut 130, which is locked by means of nut 131. Plunger 129 is held in position by means of a spring 132, and is thus resiliently supported so that when an excessive length of pivot is fed by the pivot feeding means to be described below, it will not bend the pivot.

Figure 2:
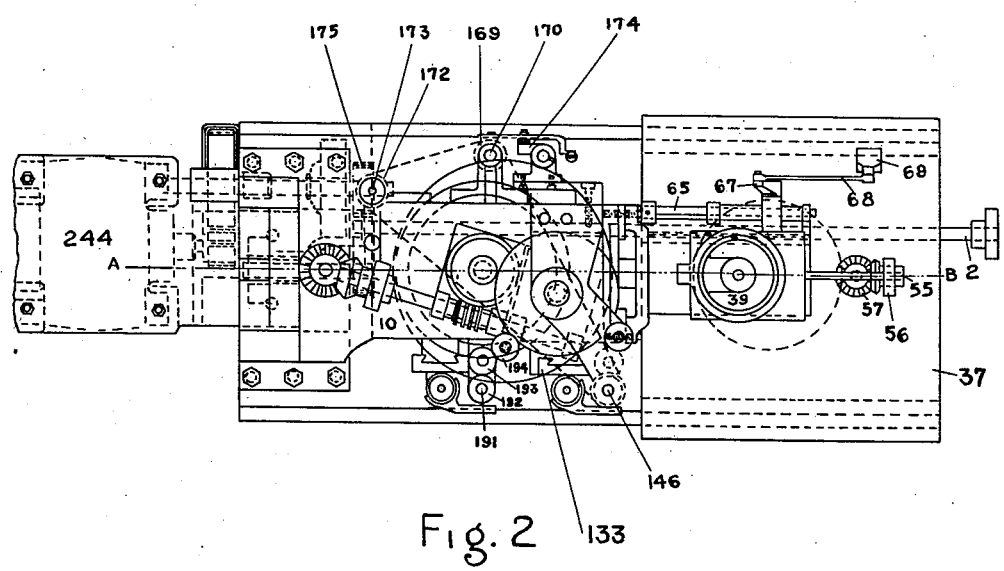
Fig. 2 is a top view of Fig. 1.
Figure 12:
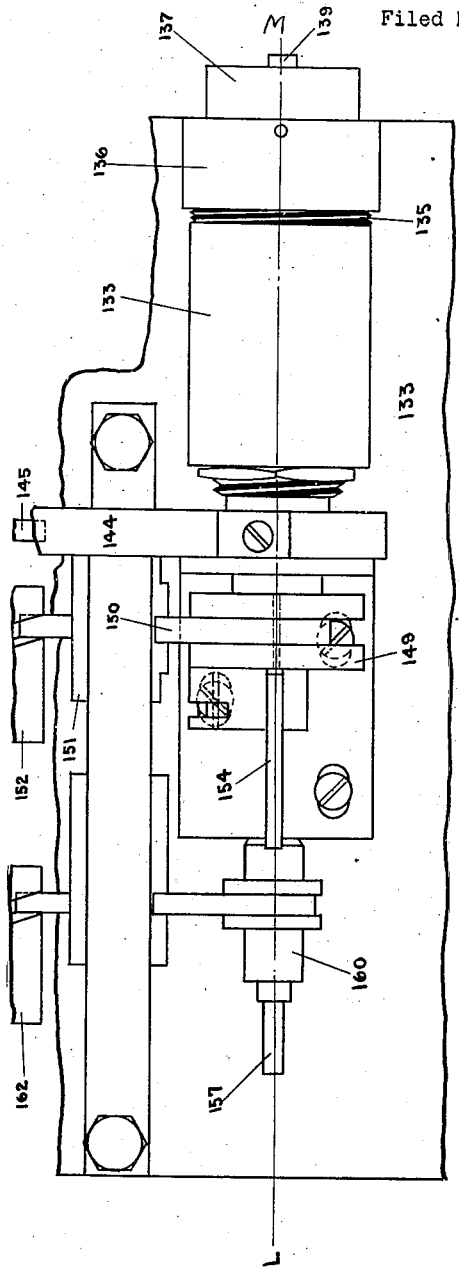
Fig. 12 is a partial top view of the pinion wire feeding device.
Figure 13:
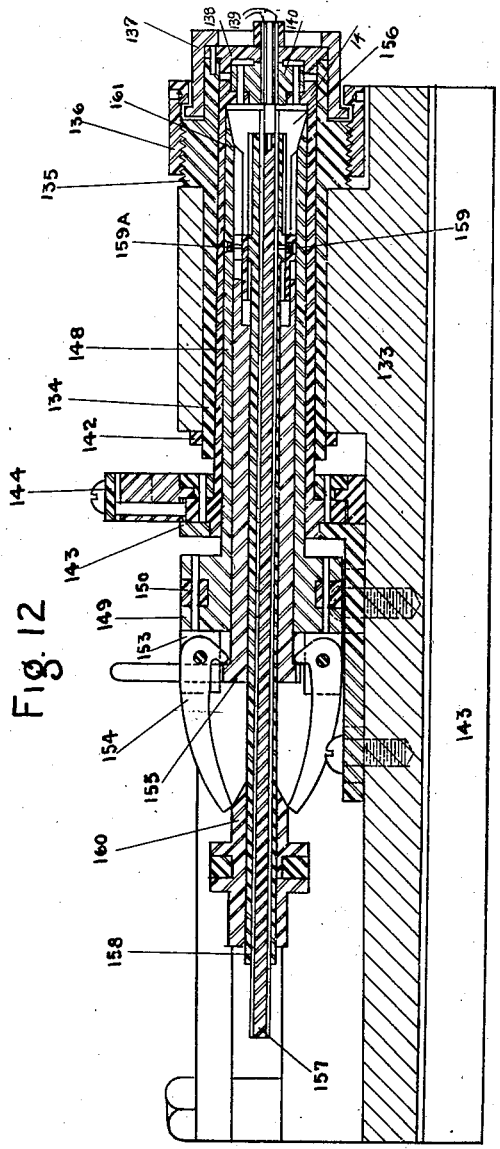
Fig. 13 is a cross sectional view of Fig. 12, along a line L. M.
Figure 16:
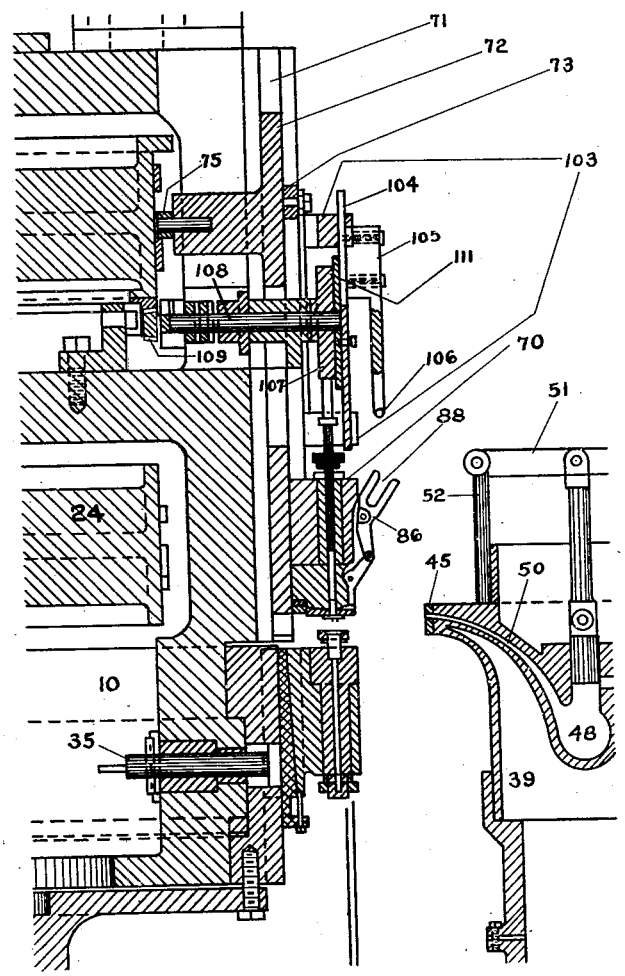
Figure 16 is an enlarged view of the upper right hand part of Figure 3.
Figure 17:
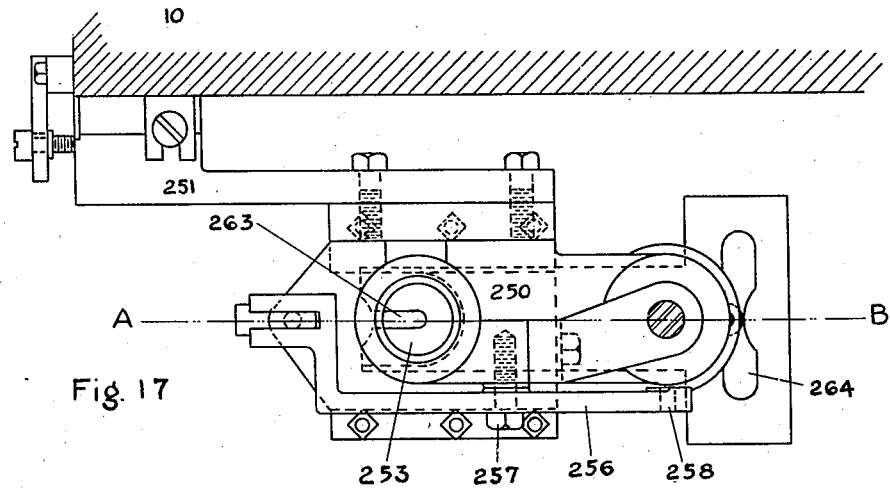
Figure 17 is a top view of the wheel feeding device.
Figure 18:
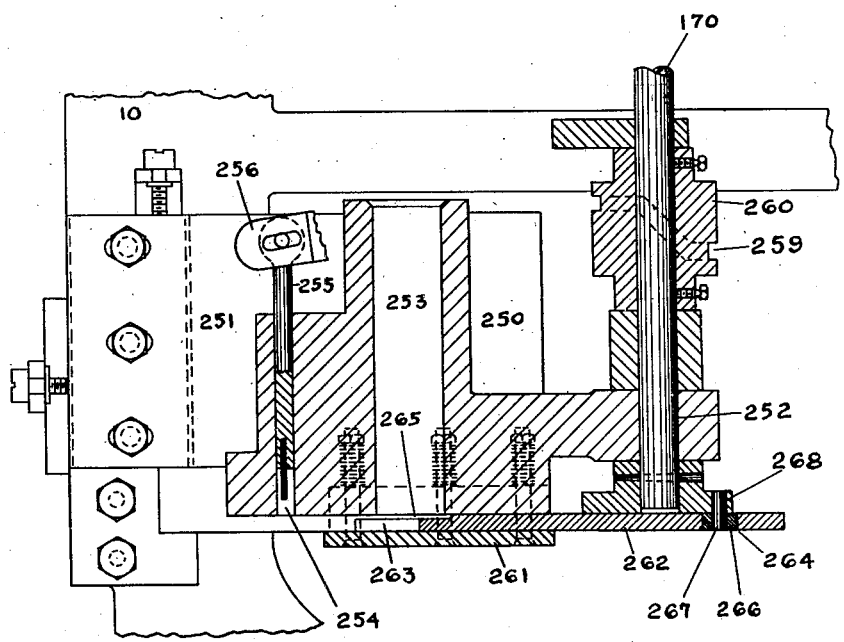
Figure 18 is a cross sectional view of the wheel feeding device along a line A. B. of Figure 17.

The pinion feeding means comprises a head or member 133, slidably mounted on frame 10 (see Figs. 1 and 2). Said member has an aperture (see Figs. 12 and 13) in which is mounted a tubular member 134 having a threaded shouldered part 135 on which is mounted a capping nut 136 which retains the die holding collar 137 which with the pin shown holds the die 138 on the end and inside of the tubular part of 134. Die 138 has a plurality of apertures 139 which register with the apertures in the pinion holding means above described, so that wires in die 138 will enter the apertures of 118 above mentioned when the member 133 is moved downwardly to 118. Immediately against die part 138 is a shearing or cut off die 140 having apertures which register with apertures 139, said die 140 being fastened into a tubular member 141 which is rotatably mounted in 134, said member 134 being held in the aperture of 133 by means of a nut 142. Tubular member 141 is retained in the position shown by means of an adjustable stop 143, and has a lever 144 fastened to it which is actuated by a cam 145 on shaft 146 (see Fig. 1) which is journaled in bearings 147 on 133, and rotates the shearing die 140 cutting off the pinion wires and leaving them in the pinion die holding means when member 133 is moved upwardly, and away from pinion holding die 118. Slidably mounted inside of tubular member 141 is a draw sleeve member 148, which has a double shouldered part 149 in which is mounted a part 150 which engages and is actuated by a member 151 slidably mounted on 133, which in turn receives its motion from a cam 152 mounted on the shaft 146. Forming a part of 149 and projecting outwardly from same is a plurality of lugs 153 in each pair of which is pivotally mounted by means of the pin shown a chucking finger 154 which engages a chucking tube 155 which is slidably mounted in member 148 and connected with a chuck 156 having a plurality of jaws each one of which engages one of the pinion wires that pass through the shearing or cutoff die 140 and presses said pinion wire against the wire core which comprises a rod 157 having a plurality of slots that register with said jaws and the apertures in the shearing die 140, which rod is fastened into a tubular member 158 which is slidably mounted in tubular member 155 and fastened to the chuck 156 by means of a screw 159 as shown. Slidably mounted on 158 is the chucking cone member 160 whose coned end permits the ends of the fingers 154 to slide up on same, raising said fingers and drawing the chuck parts against the conical end 161 of 148 and forcing the chucking jaws inwardly and causing them to hold the pinion wires against the rod 157 and permit the ends of the wire to be fed forward when so grasped. It is evident, that when the wires are not grasped as just described the rod 157 is free to slide on the pinion wires especially when the shearing die is slightly rotated to a point where the wires are partially cut off by means of lever 144 and cam 145 which actually is done to hold the wires while the chuck 156 is drawn backward to again grasp the pinion wires and feed them forward by the cam 152 as above described, the locking and unlocking of the chuck being done by member 160 which is similarly actuated by a cam 162 as the feeding of the pinion wire is accomplished by cam 152 as above described. From the above description it is evident that the pinion feeding means is operated by means of shaft 146 and said shaft is extended upwardly (see Fig. 1) and rotatably and slidably mounted in a frame 20 mounted on frame 10 as above mentioned. Mounted rigidly on said shaft 146 near its upper end, but below bearing 163 is a spur gear wheel 164 which is moved downwardly into mesh with segment gear 21 and upwardly out of mesh again by means of pin and roller 165, fastened to and projecting from member 133 which engages cam 166 on cam wheel 24 which is rotated giving the motion to 133 as above described.

Slidably mounted on said shaft 146 but above frame 20 and retained against moving vertically by means of stop plate 167 and further so mounted that it rotates with shaft 146 is a sprocket gear 163 into which is meshed a suitable sprocket chain 168, which is extended to engage a similar sprocket 169 which is fastened on a shaft 170, which is journaled on a bearing 171 mounted on frame 10, and also a similar sprocket 172 fastened to a shaft 173 which is journaled in a bearing 173^A mounted on frame 10. It is evident, that when shaft 146 is rotated one revolution by means of segment gear 21 that shafts 170 and 173 will each be rotated one revolution.

Shaft 170 is extended downwardly and forms the driving means for the wheel feeding device 174, which is similar to the disk feeding machine described in my Patent No. 867,834. This wheel feeding device drops the wheel into the wheel holding means which is described below, said wheel feeding device comprising a body part 250 which is adjustably fastened by means of an arm 251 to vertical frame 10 and which has a bearing 252 in which the shaft 170 is journalled and an aperture 253 into which the wheels are loaded and an aperture 254 into which is slidably mounted a pin 255 which is pivotally connected to a lever 256 which is journalled on a pin 257 fastened to said body part 250 and whose other end has a pin 258 which engages a groove 259 in cam 260 which is fastened on said shaft 170. Slidably mounted in said body part 250 and held in position by means of the spring loaded plate 261 shown is a member 262 having an elongated curved aperture 264 as shown in the enlarged part on one end and a recessed part 265 and a slot 263 on the other end, said recessed part registering with the lower part of the aperture 253 the function of said recessed part being to remove a wheel from the bottom of the stack of wheels as the member 262 is reciprocated by means of a roll 266 traveling in said elongated curved aperture 264, said roll being journalled on a pin 267 fastened on a disk 268 which is mounted on said shaft 170 which is rotated as above described. When said member 262 carrying a wheel in its recessed part 265 is moved forwardly sufficiently until the aperture in the wheel comes into line with pin 255 the said pin 255 is pushed downwardly through said aperture in the wheel, said pin being located immediately above the wheel holding means, and the sliding member 262 reciprocated back towards said wheel loading aperture until the wheel is freed from said sliding member and drops into the wheel holding means.

Figure 3:
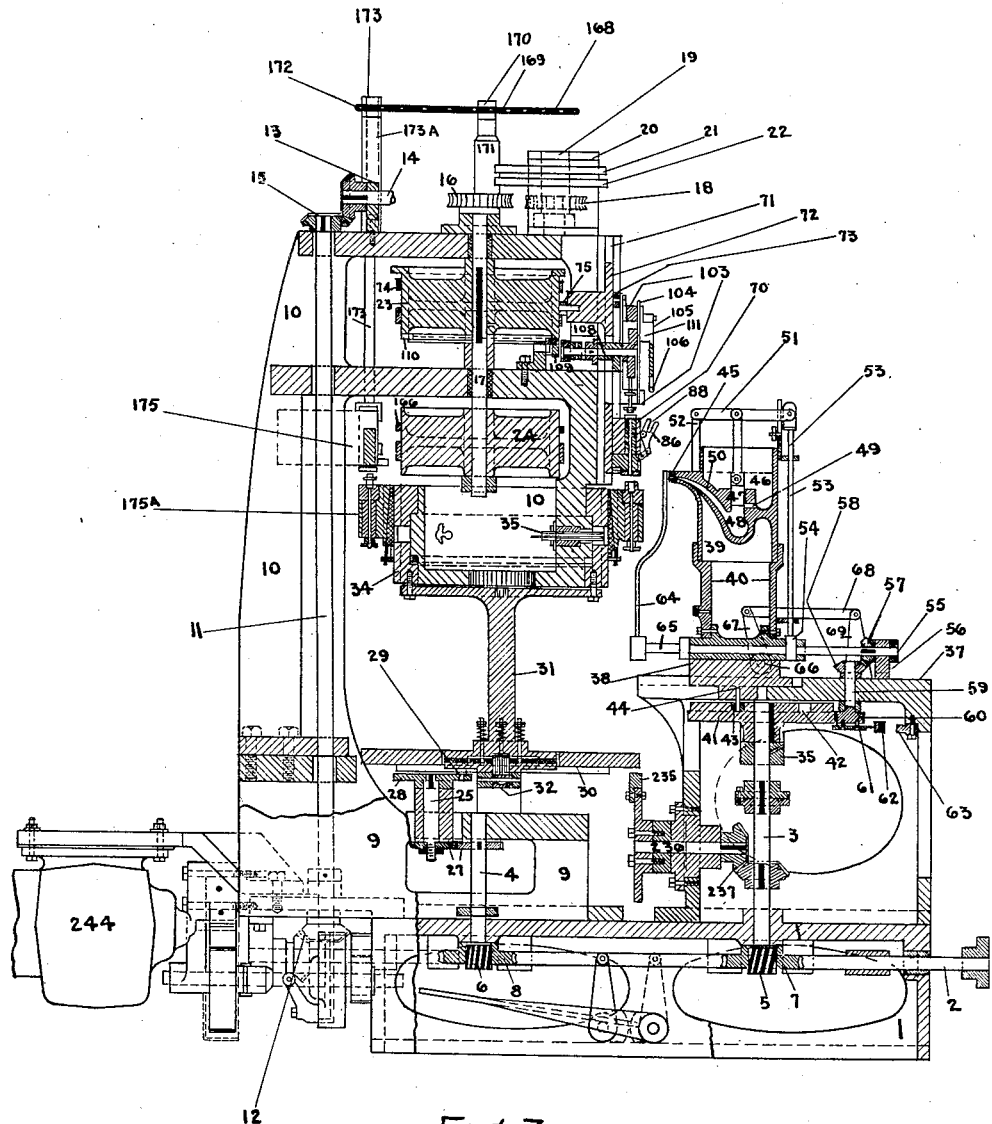
Figure 3 is a vertical cross sectional view through the center of my invention along a line A. B. as shown on Figure 2.

Shaft 173 is extended downwardly and forms the driving means for the washer feeding device 175 which also is similar in construction to the disk feeding machine described in my Patent No. 867,834—and the wheel feeding device above mentioned. This washer feeding device drops the washer into the washer holding means which comprises a member 175^A fastened to the turret 34, said member having an aperture in which is mounted a tubular member 176 having a shouldered part 177 and a screw threaded part 178 with which by means of nut 179 it is locked in the position shown. Holes 180 are provided to rotate 176 when required. Fastened in the end 176 adjacent to 177 is the die part 181 which has the apertures shown, which register with the apertures in the die of the pinion and pivot holding means above described. Slidably mounted on 181 is a cup shaped member 182 which positions the washer used to cap the mold in the upper assembling means after the pinion and pivot wires are assembled as shown in Fig. 3 of my Patent No. 905,915. A spring 183 keeps the member 182 in the position shown and permits it to be lowered when the upper assembling means is brought down on it in putting the washer on the pinion wires as shown, while member 184 which is adjustably fastened on 176 by means of the screw thread shown limits its further movement on the die 181. Member 184 is finally locked in position by a nut 185. Capping nut 186 which carries a receptacle 187 to catch the washer material punched out by the pinion wires as they pierce the washer is mounted threaded part 178 as shown.

The pivot feeding means 188 is slidably mounted on a part 189 fastened to frame 10 and is similarly moved upwardly and downwardly by means of pin and roller described for the pinion feeding means above and said roller is actuated by cam 190 on cam wheel 24. The pivot feeding means is practically a duplicate of the construction of the pinion feeding means with exception that only one wire is fed by it in place of the plurality of wires fed by the pinion feeding means, and it is therefore believed unnecessary to describe same in detail.

The shaft 191 which is journaled in pivot feeding device 188 extends upwardly and is similarly journaled on frame 10 and has a similar spur gear 192 fastened to it, and which similarly engages a spur gear 193 in its lower position, and does not engage spur gear 193 in its upper position. Said spur gear 193 meshes with another gear 194, which is engaged by the teeth of the segment gear 22 so that shaft 191 is rotated one revolution whenever said pivot feeding means 188 is retained in its lower position.

The wheel holding and assembling means comprises a member 195 mounted on the turret 34 said member having an aperture in which is mounted a tubular member 196 which has a larger or head part 197 and a threaded part 198 on which is mounted a nut 199 which holds tubular member 196 in 195. Mounted in the enlarged aperture in 197 is a member 200 which has a mold cavity 201 and sprue cavity 202 leading into said mold cavity 201. Adjacent to and concentric with the aperture 201 in member 200 is the wheel holding cup 203 which holds the wheel blank and whose aperture aligns with the aperture 201 and completes the mold part, and is the space that is filled with molten metal to unite the wheel with the pinion and pivot wires. Wheel holding cup 203 is securely held in position by means of the plate 204 shown which is fastened to the part 197 by means of screws not shown, and which with said wheel holding cup 203 completes the sprue cavity 202 as shown. Member 200 has a slot part which registers with a channel in part 197, in both of which is fitted the sprue ejector 205 which has a point 206 which projects into the sprue cavity and which removes the sprue when ejector 205 is rotated around on pin 207 by means of which said ejector is pivotally mounted on the shouldered part 197 as shown. Ejector 205 is actuated by means of a lever 208 pivotally connected to it by pin connection at 209, and pivotally connected to a lever 210 which in turn is pivotally connected to member 195 at 211, all as shown and indicated in the drawing. Fastened to lever 210 is a cam member 212 which as member 195 is rotated with the turret 34 strikes a roller 213 set in its path and fastened to an extension 214 from frame 10 as indicated in the drawing (see Fig. 1) which cam striking 213 is pressed down by it, thus partially rotating the ejector as described above and removing the sprue. The cam 212 is held upwardly holding ejector 205 in position shown by means of the spiral spring indicated.

Slidably mounted in aperture 201 is a plunger 215 which is fastened by means of the screw threads shown, into a member 216, slidably mounted on the inner part of tubular member 196, and which has a smaller cylindrical portion 217 which passes through an aperture in the threaded capping nut 218, which is locked in position by means of the lock nut 219. In the center aperture of plunger 215 is mounted a smaller plunger 220 of the size of the pivot wire to be used which terminates in a larger plunger 222 slidably mounted in an aperture in the center of member 216, and held in the position shown by means of the spiral spring 223 the tension of which is adjusted by means of the screw 224 shown. Mouted on the threaded end of 217 is a bar 225 which is adjusted and held in position by means of nuts 226 and 227. Adjustably mounted by means of the threads and nuts shown, in each side of bar 225 are rods 228 which pass upwardly through part 197 and plate 204, and projecting sufficiently beyond said plate 204 to just touch the lower part or plate 89 of the upper assembling means, and assists in removing the crushing pressure as well as the tendency to fall apart of the assembled parts if any of the component parts fit the holding means very closely and is actuated by the following means; a rod 229 is slidably mounted in the lower or flanged part of turret spider 31 and in line with part 217 and has an end part 230 which projects beyond 31, while the upper part of said rod 229 is slidably mounted in a bearing 231 mounted on turret 34 so that the upper part of rod 229 when raised up will press part 224 thereby raising plunger 215 and the rods 228 above mentioned, the lower end 230 of said rod 229 coming into the path of a member 232 which is pivotally mounted on a projecting part 233 fastened to frame 36 and further has a roller 234 which rides on cam 235 which is fastened to a shaft 236 journaled in said frame 36 and is driven by shaft 3 by means of the bevel gears 237 shown. 238 and 239 are guiding tubes that guide the pinion wires and pivot wire respectively, from reels containing same to the respective feeds to avoid kinking the wire. 240— 241— 242— and 243 are hand wheels for manually actuating any one of the respective feeds, the pinion feed, the wheel feed, the washer feed and the pivot feed independent of the automatic mechanism, should any of them not function properly.

My machine is here shown driven by motor 244 and a clutch 245 for starting and stopping, and as the machine can be driven by any of the usual familiar methods it is not believed necessary to give the details shown, especially when it is evident that the main driving shafts 2 and 11 run at the same speed.

In practice my machine operates as follows:

Full rolls of each pinion wire and pivot wire are supplied and connected up in the pinion feed device, and in the pivot feeding device and a high column of the wheel blanks is put into the wheel feeding device, and a similar column of the washers is put in the washer feeding device and the metal is put into the melting pot and properly melted. We will assume the turret 34 has been positioned so that the pinion and pivot holding device is directly under the pinion wire feed which pinion wire feed moves downward and its cam shaft rotated once by means of the segment gear 21 which in turn operates the washer feeding device and the wheel feeding device dropping their respective parts into the washer holding device and the wheel holding and assembling device when the turret is rotated forward one step (1/6 rotation) and stopped bringing the pinion and pivot holding device or means directly under and in line with the pivot feeding device which is alone actuated at the time as far as feeds are concerned as we will have the casting pot plunger disconnected so it cannot fill the mold cavity with molten metal, and as there are two sets of pinion and pivot holding means, two sets of washer holding means, and two sets of wheel holding and assembling means these feeding operations will be continued as mentioned as the turret steps around intermittently as described until the pinion and pivot holding means is stopped under the upper assembling means when said upper assembling means is lowered into said pinion and pivot holding means, and when said means are together the metal casting pot comes forward and fills the resulting mold cavity with molten metal through the sprue cavity 78 as above described which metal fills said cavity and holds the pinion wires and the pivot wire and the metal itself in the mold, in other words, the pinion is assembled and the casting pot is moved away and the upper assembling means is raised upwardly and the turret 34 makes the next step bringing the pinion and pivot holding means again under the pinion feeding device for the refilling of the pinion wires as above mentioned, and also for putting in the metal washer and wheel in their respective holding means as above described. The zinc washer holding cup is now directly under the upper assembling means and said upper assembling means is now dropped and pushed downwardly forcing the pinion wires through the washer which is preferably made of thin sheet metal with an aperture in the center large enough to permit the metal strengthening core to pass through same as shown in Fig. 3 in above mentioned Patent No. 906,915. Upper assembling means is then raised and with it the assembled pinion wires pivot wire and washer and the turret 34 then makes another movement in same direction moving one more step and stopping, bringing the wheel holder and assembling means directly under the upper assembling means, when said upper assembling means is lowered so that its end 91 is lowered into the cup-shaped member 203 of the wheel holding and assembling means holding the wheel between said end 91 and the inner surface of said cup-shaped member 203 at which time the pot of molten metal is brought up so that the aperture in its nozzle plate 45 lines up with the sprue aperture 202 and said nozzle plate 45 is tight against said wheel holding and assembling means when the plunger 47 is again forced downwardly forcing the molten metal into the mold cavity, thus making the pinion and wheel complete similar to that shown in Fig. 1, of said Patent No. 906,915. While operation just described is taking place, the pivot feeding device is moved downwardly and actuated over the pinion and pivot holding means and a pivot inserted in said pinion and pivot holding means as above described. The upper assembling means is now raised and simultaneously with the rising of the upper assembling means by cam 23, the rods 228 are pushed upwardly by means of the rod 229 and the cam 235 as above described, thus removing the complete wheel assembled part from the wheel holding and assembling means and carrying it away in the upper assembling means and as soon as this has been accomplished all the parts engaged in the operation are returned to their former positions and the turret starts moving another step, bringing a pinion and pivot holding means in line with the upper assembling means when the process of starting another part will begin.

As the upper assembling means is moved upwardly and the turret moves, the completed wheel is ejected from the mold part and the sprue from the sprue cavity and the operation of ejecting the completed part is so timed in relation to the moving of the turret 34 so that the completely assembled part drops between two of the holding means into a suitable receptacle fastened to turrent 34, when the various operations are repeated continuously. As turret 34 rotates the sprue in the wheel holding and assembling means is removed by the means above described, and is again ready to repeat the operation just described when its turn comes so to do.

It is evident from the above description that my invention comprises a machine for completely assembling pinions and wheels and a machine that is entirely automatic in its operation requiring no manual feeding of the individual component parts into separate respective holding means.

It will be understood, of course, that while I have here shown one form of my invention, I do not wish to limit myself to the exact construction shown, but wish to have it taken in a sense illustrative of any and all forms of my invention as come fairly within the scope of my claims.

I claim:

1. In a machine for manufacturing and mounting pinions and wheels, an assembling means comprising a member having a cavity and a sprue aperture reaching into said cavity and sprue ejecting means in and forming a part of said sprue aperture.

2. In a machine for manufacturing and mounting pinions and wheels, an assembling means comprising a member having a cavity and a sprue aperture reaching into said cavity and sprue ejecting means in and forming a part of said sprue aperture, said sprue ejecting means comprising a lever pivotally mounted on said member.

3. In a machine for manufacturing and mounting pinions and wheels, an assembling means comprising a member having a cavity and a sprue aperture reaching into said cavity and sprue ejecting means in and forming a part of said sprue aperture, said sprue ejecting means comprising a lever pivotally mounted on said member and means for actuating said sprue ejecting means.

4. In a machine for manufacturing and mounting pinions and wheels, an assembling means comprising a member having a cavity and a sprue aperture reaching into said cavity and sprue ejecting means in and forming a part of said sprue aperture, said sprue ejecting means comprising a lever pivotally mounted on said member and means for actuating said sprue ejecting means, and a plunger slidably mounted in one end of said cavity.

5. In a machine for manufacturing and mounting pinions and wheels, an assembling means comprising a member having a cavity and a sprue aperture reaching into said cavity and sprue ejecting means in and forming a part of said sprue aperture, said sprue ejecting means comprising a lever pivotally mounted on said member and means for actuating said sprue ejecting means, a plunger having an aperture slidably mounted in one end of said cavity and a pin resiliently and slidably mounted in said aperture in said plunger.

6. In a machine for manufacturing and mounting pinions and wheels, an assembling means comprising a member having a cavity and a sprue aperture reaching into said cavity and sprue ejecting means in and forming a part of said sprue aperture, said sprue ejecting means comprising a lever pivotally mounted on said member and means for actuating said sprue ejecting means in combination with means for forcing molten metal into said cavity by means of said sprue aperture.

7. In a machine for forming and mounting pinions and wheels, an assembling device comprising a movably mounted holding means, a mold having sprue aperture, sprue ejecting means in said sprue aperture and an ejecting means for removing the assembled part from said mold.

8. In a machine for forming and mounting pinions and wheels, an assembling device comprising a movably mounted holding means, a mold having a sprue aperture mounted in said holding means, sprue ejecting means pivotally mounted on said mold forming a part of said sprue aperture and ejecting means for removing the assembled parts from said mold.

9. In a machine for forming and mounting pinions and wheels, an upper assembling means comprising a mold having a sprue aperture, a sprue pulling and ejecting means projecting into said sprue aperture and means on said mold which coact with said sprue pulling and ejecting means to clear the interior of the mold.

10. In a machine for forming and mounting pinions and wheels, an upper assembling means comprising a mold having a sprue aperture, a sprue pulling and ejecting means projecting into and forming a part of the wall of said sprue aperture and means on said mold coacting with said sprue pulling and ejecting means to clear the interior of said mold.

11. In a machine for forming and mounting pinions and wheels, an assembling device comprising a movably mounted holding means having an aperture, a tubular member having a channel mounted in said aperture, a slidably mounted member in the inside of said tubular member resiliently retained in position in same by means of a cap and spring, a mold portion having a slot which registers with said channel and an aperture mounted in the opposite end of said tubular member, a suitably shaped end retaining member having an aperture, and an ejecting member pivotally mounted in said channel and means for actuating said ejecting member.

12. In a machine for forming and mounting pinions and wheels, an assembling device comprising a movably mounted holding means having an aperture, a tubular member having a channel, mounted in said aperture, a member slidably mounted in the inside of said tubular member resiliently retained in position by means of a cap and spring, a mold portion having a slot which registers with said channel and an aperture mounted in the opposite end of said tubular member, a suitably shaped end mold retaining member having an aperture, ejecting means pivotally mounted in said channel with means for actuating said ejecting member and ejecting means for removing the assembled parts from said mold.

13. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue pulling ejector in said channel forming a part of the wall of said sprue aperture.

14. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue pulling and ejecting means pivotally mounted in said channel and forming a part of the wall of said sprue aperture.

15. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue pulling ejector in said channel forming a part of the wall of said sprue aperture in combination with means for forcing molten metal into said sprue aperture and said mold cavity.

16. In a machine for forming and mounting pinions and wheels, and assembling means comprising a wheel retaining member having an aperture, a mold whose cavity is adjacent to said aperture having a sprue aperture, a channel formed in said mold member joining said sprue aperture and a sprue pulling and ejecting means pivotally mounted in said channel and forming a part of the wall of said sprue aperture in combination with means for forcing molten metal into said sprue aperture and said mold cavity.

17. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue pulling and ejecting means pivotally mounted in said channel and forming a part of the wall of said sprue aperture in combination with means for forcing molten metal into said sprue aperture and said mold cavity, and means for ejecting said metal from said mold cavity.

18. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue ejector in said channel forming a part of the wall of said sprue aperture and mechanism for actuating said sprue ejector.

19. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue ejector in said channel forming a part of the wall of said sprue aperture and mechanism for actuating said sprue ejector, in combination with means for forcing molten metal into said sprue aperture and said mold cavity.

20. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue ejector in said channel forming a part of the wall of said sprue aperture and mechanism for actuating said sprue ejector in combination with means for forcing molten metal into said sprue aperture and said mold cavity and means for ejecting said metal from said mold cavity.

21. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue ejector in said channel forming a part of the wall of said sprue aperture and mechanism for actuating said sprue ejector in combination with means for forcing molten metal into said sprue aperture and said mold cavity and means for ejecting said metal, said means comprising a resiliently mounted plunger projecting into said mold cavity.

22. In a machine for forming and mounting pinions and wheels, an assembling means comprising a wheel retaining member having an aperture, a mold whose cavity is adjacent to said aperture having a sprue aperture, a channel formed in said mold member joining said sprue aperture and a sprue ejector in said channel forming a part of the wall of said sprue aperture and mechanism for actuating said sprue ejector in combination with means for forcing molten metal into said sprue aperture and said mold cavity, and means for ejecting said metal, said means comprising a resiliently mounted plunger projecting into said mold cavity and mechanism for actuating said plunger.

23. In a machine for forming and mounting pinions and wheels, an assembling means comprising a member having a cavity and a sprue aperture extending into said cavity and sprue ejecting means in and forming a part of said sprue aperture, in combination with an auxilliary assembling means comprising a wheel retaining member having an aperture, a mold member having a cavity adjacent to said aperture having a sprue aperture, a channel, formed in said mold member extending into said sprue aperture and a sprue ejecting means in and forming a part of said sprue aperture.

24. In a machine for forming and mounting pinions and wheels, an assembling means comprising a member having a cavity and a sprue aperture extending into said cavity and sprue ejecting means in and forming a part of said sprue aperture, in combination with a cooperative assembling means comprising a wheel retaining member having an aperture, a mold member having a cavity adjacent to said aperture, having a sprue aperture, a channel formed in said mold member extending into said sprue aperture and a sprue ejecting means in and forming a part of said sprue aperture.

25. In a machine for forming and mounting pinions and wheels, an assembling means comprising a member having a cavity and a sprue aperture extending into said cavity and sprue ejecting means in and forming a part of said sprue aperture and means actuating said ejecting means in combination with an auxiliary asssembling means comprising a wheel retaining member having an aperture, a mold member having a cavity adjacent to said aperture and having a sprue aperture, a channel formed in said mold member extending into said sprue aperture and a sprue ejecting means in and forming a part of said sprue aperture.

26. In a machine for forming and mounting pinions and wheels, an assembling means comprising a member having a cavity and a sprue aperture extending into said cavity and sprue ejecting means in and forming a part of said sprue aperture, and means actuating said ejecting means in combination with a co-operative assembling means comprising a wheel retaining member having an aperture, a mold member having a cavity adjacent to said aperture and having a sprue aperture, a channel formed in said mold member extending into said sprue aperture and a sprue ejecting means in and forming a part of said sprue aperture.

27. In a machine for forming and mounting pinions and wheels, an assembling means comprising a member having a cavity and a sprue aperture extending into said cavity and sprue ejecting means in and forming a part of said sprue aperture, with means for positioning said assembling means, in combination with an auxiliary assembling means comprising a wheel retaining member having an aperture, a mold member having a cavity adjacent to said aperture and having sprue aperture, a channel formed in said mold member extending into said sprue aperture and a sprue ejecting means in and forming a part of said sprue aperture.

28. In a machine for forming and mounting pinions and wheels, an assembling means comprising a member having a cavity and a sprue aperture extending into said cavity and sprue ejecting means in and forming a part of said sprue aperture, in combination with a co-operative assembling means comprising a wheel retaining member having an aperture, a mold member having a cavity adjacent to said aperture having a sprue aperture, a channel formed in said mold member extending into said sprue aperture and a sprue ejecting means in and forming a part of said sprue aperture, and means for positioning both of said assembling means.

29. In a machine for forming and mounting pinions and wheels, an assembling means comprising a member having a cavity and a sprue aperture extending into said cavity and sprue ejecting means in and forming a part of said sprue aperture, in combination with an auxiliary assembling means comprising a wheel retaining member having an aperture, a mold member having a cavity adjacent to said aperture having a sprue aperture, a channel formed in said mold member extending into said sprue aperture and a sprue ejecting means in and forming a part of said sprue aperture, and means for injecting a metal into each of said assembling means.

30. In a machine for forming and mounting pinions and wheels, an assembling means comprising a member having a cavity and sprue aperture extending into said cavity and sprue ejecting means in and forming a part of said sprue aperture, in combination with a co-operative assembling means comprising a wheel retaining member having an aperture, a mold member having a cavity adjacent to said aperture having a sprue aperture, a channel formed in said mold member extending into said sprue aperture and ejecting means in and forming a part of said sprue aperture, and means for injecting a molten metal into each of said assembling means.

31. In a machine for forming and mounting pinions and wheels, an upper assembling means comprising a member having a cavity and sprue aperture extending into said cavity and sprue ejecting means in and forming a part of said sprue aperture, in combination with a co-operative assembling means comprising a wheel retaining member having an aperture, a mold member having a cavity adjacent to said aperture having a sprue aperture, a channel formed in said mold member joining said sprue aperture and a sprue ejecting means in and forming a part of said sprue aperture, and means for injecting a molten metal into each of said assembling means.

32. In a machine for forming and mounting pinions and wheels, an assembling means comprising a member having a cavity and a sprue aperture extending into said cavity and a sprue ejecting means in and forming a part of said sprue aperture, in combination with an assembling means comprising a wheel retaining member having an aperture, a mold member having a cavity adjacent to said aperture having a sprue aperture, a channel formed in said mold member extending into said sprue aperture and a sprue ejecting means in and forming a part of said sprue aperture, and means for injecting a metal into each of said assembling means and mechanism for removing said metal from said wheel retaining assembling means.

33. In a machine for forming and mounting pinions and wheels, an assembling means comprising a member having a cavity and a sprue aperture extending into said cavity and sprue ejecting means in and forming a part of said sprue aperture, in combination with an auxiliary assembling means comprising a wheel retaining member having an aperture, a mold member having a cavity adjacent to said aperture having a sprue aperture, a channel formed in said mold member extending into said sprue aperture and a sprue ejecting means in and forming a part of said sprue aperture, and means for injecting a metal into each of said assembling means, and co-operative mechanism for removing said metal from both of said assembling means.

34. In a machine for forming and mounting pinions and wheels, an assembling means comprising a member having a cavity and sprue aperture extending into said cavity and sprue ejecting means in and forming a part of said sprue aperture, in combination with a cooperative assembling means comprising a wheel retaining member having an aperture, a mold member having a cavity adjacent to said aperture having a sprue aperture, a channel formed in said mold member extending into said sprue aperture and a sprue ejecting means in and forming a part of said sprue aperture, and means for injecting a binding material into each of said assembling means.

35. In a machine for forming and mounting pinions and wheels, an assembling means comprising a member having a cavity and sprue aperture extending into said cavity and sprue ejecting means in and forming a part of said sprue aperture, in combination with a cooperative assembling means comprising a wheel retaining member having an aperture, a mold member having a cavity adjacent to said aperture having a sprue aperture, a channel formed in said mold member extending into said sprue aperture ejecting means in and forming a part of said sprue aperture, and means for injecting a binding material into each of said assembling means, and means for removing said binding material from both of said assembling means.

36. In a machine for forming and mounting pinions and wheels, an assembling means comprising a member having a cavity and sprue aperture extending into said cavity and sprue ejecting means in and forming a part of said sprue aperture, in combination with a co-operative assembling means comprising a wheel retaining member having an aperture, a mold member having a cavity adjacent to said aperture having a sprue aperture, a channel formed in said mold member extending into said sprue aperture and a sprue ejecting means in and forming a part of said aperture, a means for actuating said assembling means, and means for injecting a binding metal into each of said assembling means.

37. In a machine for forming and mounting pinions and wheels, an assembling means comprising a member having a cavity and a sprue aperture extending into said cavity and sprue ejecting means in and forming a part of said sprue aperture, in combination with an auxiliary assembling means comprising a wheel retaining member having an aperture, a mold member having a cavity adjacent to said aperture having a sprue aperture, a channel formed in said mold member extending into said sprue aperture and a sprue ejecting means in and forming a part of said sprue aperture, and means for co-operatively actuating each of said assembling means, and means for injecting a binding material into said assembling means and means for removing said binding material from said assembling means.

38. In a machine for forming and mounting pinions and wheels, an assembling means comprising a member having a cavity and a sprue ejecting means in and forming a part of said sprue aperture, in combination with an assembling device comprising a plurality of pinions and pivot retaining means.

39. In a machine for forming and mounting pinions and wheels, an assembling means comprising a member having a cavity and a sprue ejecting means in and forming a part of said sprue aperture, in combination with an assembling means comprising a plurality of pinion and pivot retaining apertures.

40. In a machine for forming and mounting pinions and wheels, an assembling means comprising a member having a cavity and a sprue aperture extending into said cavity and sprue ejecting means in and forming a part of said sprue aperture, in combination with an auxiliary assembling device comprising a plurality of pinions and pivot retaining apertures, and means for co-operatively positioning said assembling means and said auxiliary assembling device and mechanism for injecting a molten metal into the cavity of said assembling means.

41. In a machine for forming and mounting pinions and wheels, an assembling means comprising a member having a cavity and a sprue aperture extending into said cavity and sprue ejecting means in and forming a part of said sprue aperture, in combination with an auxiliary assembling device comprising a plurality of pinions and pivot retaining apertures, and means for co-operatively positioning said assembling means and said auxiliary assembling device and mechanism for injecting a molten metal into the cavity of said assembling means, and mechanism for ejecting the metal from said cavity and actuating said sprue ejecting means.

42. In a machine for forming and mounting pinions and wheels, an assembling means comprising a member having a cavity and a sprue aperture extending into said cavity and sprue ejecting means in and forming a part of said sprue aperture, in combination with an auxiliary assembling device comprising a plurality of pinion and pivot retaining apertures, and means for injecting a molten metal into said assembling means.

43. In a machine for forming and mounting pinions and wheels, an assembling means comprising a member having a cavity and a sprue aperture extending into said cavity and sprue ejecting means in and forming a part of said aperture, and means for injecting a molten metal into said assembling means, in combination with a washer assembling means.

44. In a machine for forming and mounting pinions and wheels, an assembling means comprising a member having a cavity and a sprue aperture extending into said cavity and sprue ejecting means in and forming a part of said aperture, in combination with a washer assembling means, comprising a member having a plurality of apertures.

45. In a machine for forming and mounting pinions and wheels, an assembling means comprising a member having a cavity and a sprue aperture extending into said cavity and sprue ejecting means in and forming a part of said aperture, in combination with a washer assembling means comprising a part having a plurality of apertures and a washer retaining cup slidably mounted on said part.

ANDREW H. NEUREUTHER.